(12) United States Patent
Lv et al.

(10) Patent No.: US 10,274,761 B2
(45) Date of Patent: Apr. 30, 2019

(54) DETECTING DEVICE FOR LIGHT-EMITTING PROPERTY OF LIGHT SOURCE

(71) Applicants: BOE TECHNOLOGY GROUP CO., LTD., Beijing (CN); BEIJING BOE DISPLAY TECHNOLOGY CO., LTD., Beijing (CN)

(72) Inventors: Jinku Lv, Beijing (CN); Rong Tang, Beijing (CN); Junjie Guo, Beijing (CN); Dan Wang, Beijing (CN); Bin Zou, Beijing (CN); Yutao Hao, Beijing (CN); Hongyu Zhao, Beijing (CN); Qian Zhang, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 179 days.

(21) Appl. No.: 14/412,915

(22) PCT Filed: May 27, 2014

(86) PCT No.: PCT/CN2014/078572
§ 371 (c)(1),
(2) Date: Jan. 5, 2015

(87) PCT Pub. No.: WO2015/096383
PCT Pub. Date: Jul. 2, 2015

(65) Prior Publication Data
US 2016/0274386 A1 Sep. 22, 2016

(30) Foreign Application Priority Data
Dec. 23, 2013 (CN) .......................... 2013 1 0718047

(51) Int. Cl.
*G02F 1/13* (2006.01)
*G01J 1/42* (2006.01)
(Continued)

(52) U.S. Cl.
CPC .......... *G02F 1/1309* (2013.01); *G01J 1/0223* (2013.01); *G01J 1/42* (2013.01);
(Continued)

(58) Field of Classification Search
CPC ........ G02F 1/1309; G02F 1/1303; G01J 1/42; G01J 3/50; G01J 3/501; G01J 3/502;
(Continued)

(56) References Cited

U.S. PATENT DOCUMENTS 5,801,545 A * 9/1998 Takekoshi .............. G09G 3/006
324/750.25
6,150,833 A * 11/2000 Lin ...................... G01R 1/0408
269/110

(Continued)

FOREIGN PATENT DOCUMENTS

CN 1842737 A 10/2006
CN 101358713 A 2/2009
(Continued)

OTHER PUBLICATIONS

Jul. 21, 2015—First Office Action Appn 201310718047.7 with Eng Tran.
(Continued)

*Primary Examiner* — John R Lee
(74) *Attorney, Agent, or Firm* — Banner & Witcoff, Ltd.

(57) ABSTRACT

A detecting device for light-emitting property of a light source is provided and the detecting device for light-emitting property of a light source includes: a positioning device configured for fixing the light source; and a detection apparatus configured for acquiring a parameter of an emer-
(Continued)

gent light from the light source. The detecting device for light-emitting property of a light source can detect the light-emitting property of the light source, thus help to select the chrominance and brightness degree, of a light source, required by a display module, and shorten the researching and manufacturing period for a liquid crystal display.

2 Claims, 1 Drawing Sheet

(51) Int. Cl.
    *G01J 3/50* (2006.01)
    *G01J 1/02* (2006.01)

(52) U.S. Cl.
    CPC ....... *G01J 3/505* (2013.01); *G01J 2001/4247* (2013.01); *G01J 2001/4252* (2013.01); *G09G 2320/0693* (2013.01)

(58) Field of Classification Search
    CPC .... G01J 3/505; G01J 3/506; G01J 2001/4252; G01J 2001/4247; G01J 1/0223; G01J 1/02; G09G 3/006; G01M 11/06
    See application file for complete search history.

(56) References Cited

U.S. PATENT DOCUMENTS

| | | | | |
|---|---|---|---|---|
| 6,366,350 B1* | 4/2002 | Thornburg | ................ | G01J 1/04 356/222 |
| 7,092,081 B2* | 8/2006 | Wang | ................ | G01J 1/42 356/218 |
| 7,377,677 B2* | 5/2008 | Kang | ................ | G02F 1/133611 349/70 |
| 7,501,617 B2* | 3/2009 | Hayami | ................ | G01J 1/02 250/226 |
| 7,619,192 B2* | 11/2009 | Sun | ................ | G01J 1/04 250/205 |
| 7,804,589 B2* | 9/2010 | Tseng | ................ | G01J 1/02 250/216 |
| 7,924,417 B1* | 4/2011 | Lin | ................ | G01J 1/4228 356/221 |
| 8,064,058 B2* | 11/2011 | Kolodin | ................ | G01J 3/02 250/227.28 |
| 8,322,884 B2* | 12/2012 | Ramer | ................ | H01L 33/44 362/242 |
| 8,807,805 B2* | 8/2014 | Kuromizu | ................ | G02F 1/133604 362/249.01 |
| 8,836,932 B2* | 9/2014 | Lin | ................ | G01J 1/04 356/213 |
| 9,104,015 B2* | 8/2015 | Matsuki | ................ | G02F 1/1336 |
| 9,176,004 B2* | 11/2015 | Yin | ................ | G01J 1/0271 |
| 9,404,962 B2* | 8/2016 | Huang | ................ | G01R 31/2635 |
| 2006/0092644 A1* | 5/2006 | Mok | ................ | H01L 33/60 362/327 |
| 2006/0203464 A1* | 9/2006 | Kang | ................ | G02F 1/133611 362/23.18 |
| 2006/0208183 A1* | 9/2006 | Hayami | ................ | G01J 1/02 250/239 |
| 2006/0245208 A1* | 11/2006 | Sakamoto | ................ | G02F 1/133603 362/612 |
| 2007/0274092 A9* | 11/2007 | Hay | ................ | G02B 5/0231 362/555 |
| 2010/0289783 A1* | 11/2010 | Leppla | ................ | G01J 1/42 345/207 |
| 2011/0019191 A1* | 1/2011 | Hsu | ................ | G01J 3/02 356/402 |
| 2011/0063850 A1* | 3/2011 | Oide | ................ | G02F 1/133603 362/296.01 |
| 2012/0105836 A1* | 5/2012 | Yoon | ................ | G01J 3/0267 356/244 |
| 2012/0306527 A1* | 12/2012 | O'Toole | ................ | G01R 31/2635 324/762.07 |
| 2013/0010231 A1* | 1/2013 | Matsuki | ................ | G02F 1/133603 349/64 |
| 2013/0050690 A1* | 2/2013 | Yu | ................ | G01J 1/0266 356/243.1 |
| 2013/0070165 A1* | 3/2013 | Shimizu | ................ | G02B 6/0091 348/739 |
| 2013/0162915 A1* | 6/2013 | Nozawa | ................ | F21K 9/00 348/739 |
| 2013/0242290 A1* | 9/2013 | Yin | ................ | G01J 1/0271 356/218 |
| 2014/0080230 A1* | 3/2014 | Sohn | ................ | G01J 1/04 438/7 |
| 2014/0106639 A1* | 4/2014 | Harbers | ................ | F21V 9/16 445/3 |
| 2014/0159733 A1* | 6/2014 | Tsai | ................ | G01R 31/2635 324/414 |
| 2014/0192351 A1* | 7/2014 | Lin | ................ | G01J 1/04 356/218 |

FOREIGN PATENT DOCUMENTS

| | | |
|---|---|---|
| CN | 101922997 A | 12/2010 |
| CN | 101984332 A | 3/2011 |
| CN | 102213615 A | 10/2011 |
| CN | 202511958 U | 10/2012 |
| CN | 102944826 A | 2/2013 |
| CN | 102980104 A | 3/2013 |
| CN | 202793745 U | 3/2013 |
| CN | 202886415 U | 4/2013 |
| CN | 103090274 A | 5/2013 |
| CN | 203259626 U | 10/2013 |
| CN | 103674496 A | 3/2014 |
| JP | 2000232242 A | 8/2000 |
| JP | 04083142 B2 | 4/2008 |

OTHER PUBLICATIONS

International Search Report dated Sep. 3, 2014 (PCT/CN2014/078572); ISA/CN.
Dec. 25, 2015—(CN)—Second Office Action App 201310718047.7 with English Tran.
Jun. 28, 2016—(WO) IPRP—App. No. PCT/CN14/078572.

* cited by examiner

DETECTING DEVICE FOR LIGHT-EMITTING PROPERTY OF LIGHT SOURCE

The application is a U.S. National Phase Entry of International Application PCT/CN2014/078572 on May 27, 2014, designating the United States of America and claiming priority to Chinese Patent Application No. 201310718047.7, filed on Dec. 23, 2013. The present application claims priority to and the benefit of the above-identified applications and the above-identified applications are incorporated by reference herein in their entirety.

TECHNICAL FIELD

Embodiments of present disclosure relate to a detecting device for light-emitting property of a light source.

BACKGROUND

Thin film transistor-liquid crystal displays (TFT-LCDs) have been widely used in televisions, cell phones, displays and similar electronic products, and dominated in the flat panel display field due to its advantages, such as steady pictures, realistic images, no irradiation, space saving and less energy consumption.

Because a liquid crystal display panel itself does not give light, a backlight module is required to provide light for displaying. The backlight module mainly includes a light bar, a reflector sheet, a light guide plate, an optical film, an adhesive frame and a rear panel etc.; and since a light-emitting diode (LED) light bar has advantages, such as small volume, low operating voltage, low operating current, even and steady light-emitting, quick response speed, as well as long working life, the backlight module commonly uses an LED light bar; and the LED light bar is formed by arranging a plurality of LED light sources in a certain pattern.

In the production process of a liquid crystal display, a plurality of tests is performed in various production phases, and for example, testing the white balance of the display module is one of the tests. The white balance of a display module is determined by the spectra of the light source in the backlight module to a great extent. Taking the LED light bar as an example, each kind of the LED light bar presents a different spectra, and thus it's necessary to select the required LED light bar. Test is generally performed by using manufactured LED light bars, in which test the spectral characteristics of the LED light bars are mainly detected so as to select the LED light bars of required chrominance as well as brightness degree.

However, the period for manufacturing a LED light bar is relatively long, usually 1~2 weeks, and it's necessary to select different LED light bars for retest. In this way, it's very easy for the entire researching and manufacturing period of a liquid crystal display to be extended.

SUMMARY

At least one embodiment of the present disclosure provides a detecting device capable of detecting the light-emitting property of a light source, and the detecting device including a positioning device configured for fixing the light source and a detection apparatus configured for acquiring a parameter of an emergent light from the light source.

The detecting device for light-emitting property of a light source provided by at least one embodiment of the present disclosure, by being provided with a positioning device configured for fixing the light source and a detection apparatus configured for acquiring a parameter of an emergent light from the light source, can detect the light-emitting property of the light source, thus help to select the chrominance and brightness degree, of a light source, required by a display module, and shorten the researching and manufacturing period for a liquid crystal display.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMERALS

1: housing plate; 2: LED light source; 21: base; 22: light-emitting portion; 3: position block; 4: spring; 5: stopper; 6: reflector sheet; 7: optical film.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

The inventor noticed that, if a LED light source is utilized for the white balance test, so as to help to select the chrominance and brightness degree of LED light bars required by the display module, it's possible to shorten the researching and manufacturing period of the liquid crystal display to a certain extent.

The detecting device for the light-emitting property of a light source provided by at least one embodiment of the present disclosure includes a positioning device and a detection apparatus. The detecting device may further include other parts, such as a power supply equipment etc. The positioning device is mainly used for fixing the light source, the power supply equipment is mainly used for providing a power supply to the light source, and the detection apparatus is mainly used for acquiring a parameter of the emergent light from the light source; by fixing the light source with the positioning device, providing a power supply to the light source with the power supply equipment so as to make the light source start illuminating, and acquiring a parameter of the emergent light from the light source with the detection apparatus, the detection of the light-emitting property of the light source is realized.

Embodiments of present disclosure are applicable for detecting the light-emitting property of a few light sources, such as a single light source, so as to help to select the chrominance and brightness degree of the light sources required by a display module, and to shorten the researching and manufacturing period for a liquid crystal display.

Detailed description will be made to the detecting device for the light-emitting property of a light source provided by at least one embodiment of the present disclosure in connection with FIGS. 1 and 2.

Figure 1:
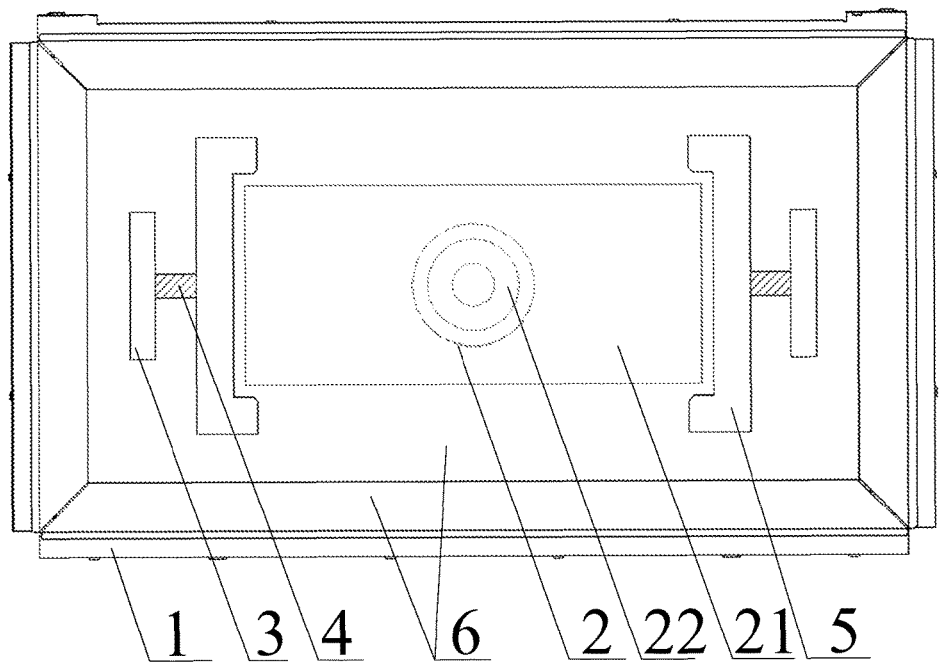
FIG. 1 is a structural schematic top view of a detecting device for light-emitting property of a light source according to an embodiment of present disclosure.
Figure 2:
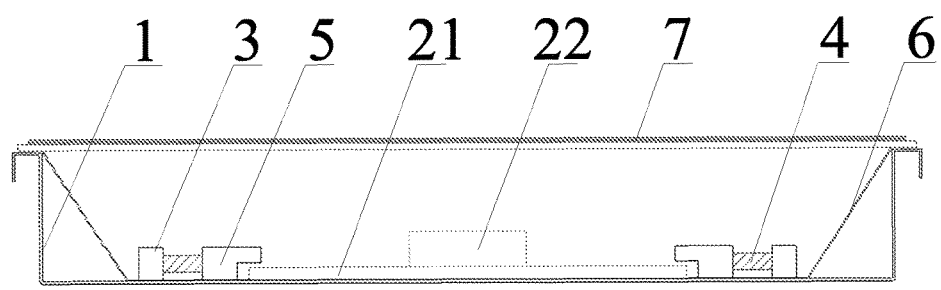
FIG. 2 is a structural schematic side view of a detecting device for light-emitting property of a light source according to an embodiment of present disclosure.

At least one embodiment of the present disclosure will be explained taking a frequently-used LED light source as the light source; as shown in FIGS. 1 and 2, the LED light source 2 of this embodiment includes a base 21 and a light-emitting portion 22 provided on the base 21; the base 21 includes, for example, a printed circuit board (PCB), the light-emitting portion 22 includes, for example, a LED chip which may be directly formed on the above-mentioned PCB; the detecting device for the light-emitting property of a light source further includes a box-shaped housing plate 1 configured for the positioning or fixing of other components; and the material of the housing plate 1 may be a metal material of high strength, for example, the housing plate 1 can be formed through punching high-quality stainless steel.

The positioning device in embodiments of present disclosure may be embodied in various ways, for example, in an embodiment of present disclosure, two opposite position blocks 3 may be provided on the housing plate 1; and the two position blocks 3 are utilized to position the LED light source 2; however, utilizing two position blocks 3 may cause damage to the LED light source 2, and LED light sources 2 of different dimensions cannot be positioned simultaneously; therefore, the positioning device in at least one embodiment of the present disclosure further includes a cushion unit connected with the position block 3, and with the cushion effect of the cushion unit, it's possible to eliminate damage to the LED light source 2, and also possible to position LED light sources 2 of different dimensions.

At least one embodiment of the present disclosure provides a manner for embodying the cushion unit. As shown in FIGS. 1 and 2, the cushion unit includes a spring 4 and a stopper 5, one end of the spring 4 is coupled with a position block 3 and the other end of the spring 4 is coupled with the stopper 5; and with the telescoping property of the spring 4, the possibility of damaging the LED light source 2 may be avoided, and at the same time, it's possible to positioning simultaneously the LED light sources 2 of difference dimensions.

In at least one embodiment of the present disclosure, the housing plate 1 is covered with a reflector sheet 6. The reflector sheet 6 is used to reflect the light emitted from the LED light source 2, and thus the brightness loss of the light from the LED light source 2 can be avoided. The reflector sheet 6 may be directly provided on the housing plate 1 and then the entire LED light source 2 is provided on the reflector sheet 6. However, the base 21 of the LED light source 2 can not reflect the light well, so partial brightness loss may still exist.

In at least one embodiment of the present disclosure, a through hole is provided in the reflector sheet 6 and is adaptive to the shape and position of the light-emitting portion 22 of the LED light source 2, the reflector sheet 6 covers the housing plate 1 and the base 21 of the LED light source 2, the light-emitting portion 22 of the LED light source 2 is exposed through the above-mentioned through hole and thus the brightness loss of the LED light source 2 can be avoided at utmost.

For higher evenness and better brightness of the light emitted from the LED light source 2, the detecting device for the light-emitting property of a light source according to at least one embodiment of the present disclosure further includes an optical film 7 provided above the LED light source 2. The optical film 7 may change the direction of and enhance the light intensity of the emergent light; and the above-mentioned optical film 7 may be arranged similarly to the optical film of the backlight module in the display device. For example, the optical film 7 in at least one embodiment of the present disclosure includes at least one selected from the group consisting of a prism film (also referred to as prism lens) and a diffusion film (also referred to as diffuser sheet or diffuser plate). The prism film may collect the light in the normal direction so as to improve front brightness and brilliance presentation, then to increase the brightness and to save energy. The main function of the diffusion film is to scatter the emergent light so as to attain an atomization effect, such that the emergent light is even more uniform and gentle. In at least one embodiment of the present disclosure, two prism films or two diffusion films can be used together, so as to optimize the emergent light even better.

As shown in FIG. 2, in at least one embodiment of the present disclosure, the optical film 7 and the housing plate 1 form a closed space in which the LED light source 2 is located, and in this way that it's possible to avoid the escape of the emergent light from the LED light source 2. At the same time, such a closed space prevents the external ambient light from doping into the emergent light emitted from the LED light source 2, so as to decrease the detection error and to make the detected result even more reliable; and at the same time, in actual test, the testing environment is a dark chamber, for example, in such a way that it's possible to depress the influence of the ambient light and enhance accuracy of the detected result at utmost.

The power supply equipment in at least one embodiment of the present disclosure is located outside of the above-mentioned closed space, and may be coupled with the LED light source using a lead wire, so that the influence of the power supply equipment upon the emergent light from the LED light source can be avoided.

In the test of the white balance of a display module, the spectra parameter of a LED light source is the most important, here the spectra means the pattern formed by splitting a polychromatic light through a chromatic dispersion system (for example, a prism, a light barrier) and then arranging the chromatically dispersed monochromatic lights successively according to the magnitude of the wavelength (or frequency) thereof. Accordingly, the detection apparatus in at least one embodiment of the present disclosure is, for example, a flat spectrographic detection instrument and naturally may also be other types of detection apparatus, so as to detect other parameters for the light-emitting property of the LED light source.

Generally speaking, the detecting device for the light-emitting property of a light source provided by at least one embodiment of the present disclosure can detect the light-emitting property of a light source conveniently and promptly, and is applicable for detecting the light-emitting property of a single light source, thus can help to select the chrominance and brightness degree of the light sources required by a display module, and can shorten the researching and manufacturing period of a liquid crystal display.

What are described above is related to the illustrative embodiments of the disclosure only and not limitative to the scope of the disclosure; the scopes of the disclosure are defined by the accompanying claims.

The present application claims the priority of the Chinese Patent Application No. 201310718047.7 filed on Dec. 23, 2013, the entirety of which is incorporated herein by reference as a part of the present application.

What is claimed is:

1. A detecting device for a light-emitting property of a light source, comprising:
   a positioning device configured for fixing the light source;
   a detection apparatus configured for acquiring a parameter of an emergent light from the light source;
   a housing plate, wherein the positioning device is provided on the housing plate, the housing plate is covered with a reflector sheet and wherein a light-emitting portion of the light source is located above the reflector sheet; and
   an optical film provided above the light source, wherein the optical film and the housing plate form a closed space inside which the light source is located;
   wherein the positioning device comprises:
      a plurality of position blocks fixed onto the housing plate; and
      a plurality of cushion units connected respectively with the position blocks, wherein
   the reflector sheet comprises a bottom part and a side part, the bottom part of the reflector sheet is in contact with the housing plate, the side part of the reflector sheet is not in contact with the housing plate, each cushion unit comprises a spring having one end connected with a corresponding position block, and a stopper connected with the other end of the spring, wherein the stoppers are configured to clamp the light source therebetween, and wherein the optical film comprises at least one selected from the group consisting of two prism films and two diffusion films.

2. The detecting device according to claim 1, further comprising a power supply equipment located outside of the closed space, wherein the power supply equipment is coupled with the light source through a lead wire.

* * * * *